Sept. 9, 1969 J. M. MARATECK ET AL Re. 26,666

FIXTURE WITH DRAWERS

Original Filed Dec. 14, 1964

INVENTORS.
JACK M. MARATECK
HAROLD MARATECK
BY Victor M. Helfand
ATTORNEY

United States Patent Office

Re. 26,666
Reissued Sept. 9, 1969

26,666
FIXTURE WITH DRAWERS

Jack M. Marateck, New York, N.Y. (785 Mace Ave., Bronx, N.Y. 10467), and Harold Marateck, New York, N.Y. (1075 Nelson Ave., Bronx, N.Y. 10452)

Original No. 3,294,466, dated Dec. 27, 1966, Ser. No. 418,002, Dec. 14, 1964. Application for reissue May 22, 1967, Ser. No. 646,751
Int Cl. A47b *67/04*
U.S. Cl. 312—343 15 Claims

Matter enclosed in heavy brackets [ ] appears in the original patent but forms no part of this reissue specification; matter printed in italics indicates the additions made by reissue.

The present invention relates to a structure, in the nature of an article of furniture or fixture, such as is used in commercial and industrial establishments, as a showcase display counter or cabinet, or the like, having an associated drawer or drawers.

The present invention is particularly directed to the drawers of such structures and the means for slidably mounting them in the structure.

It is an object of the present invention to provide structures, of the character described, and drawer therefor, that may be easily and conveniently and economically shipped and stored in knock-down position and easily and conveniently assembled, at the point of use, at a minimum of time, with great accuracy, even by persons having a minimum of skill and using few and simple tools.

It is also an object of the present invention to provide structures, of the character described, having drawers which may be assembled with great accuracy and exactness for accurate fitting and easy movement in the structures.

It is another object of the present invention to provide structures of the character described, which are strong and sturdy.

It is a further object of the present invention to provide structures, of the character described, in which both drawer and cabinet may be quickly, easily and economically repaired, to replace any part thereof, without the need of replacing the entire drawer or to dismantle the greater part thereof.

It is still a further object of the present invention to provide structures of the character described, which are of attractive appearance and which are, to a large degree, protected against damage to its surface, especially to its top and side corners.

The foregoing and other objects and advantages of the structures of the present invention will become readily apparent to those skilled in the art from the embodiment thereof shown in the accompanying drawings. It is to be understood, however, that such embodiment is shown by way of illustration only, to make the principles and practice of the invention more readily comprehensible and are without any intent of limiting the invention to the specific details therein shown.

Figure 1:
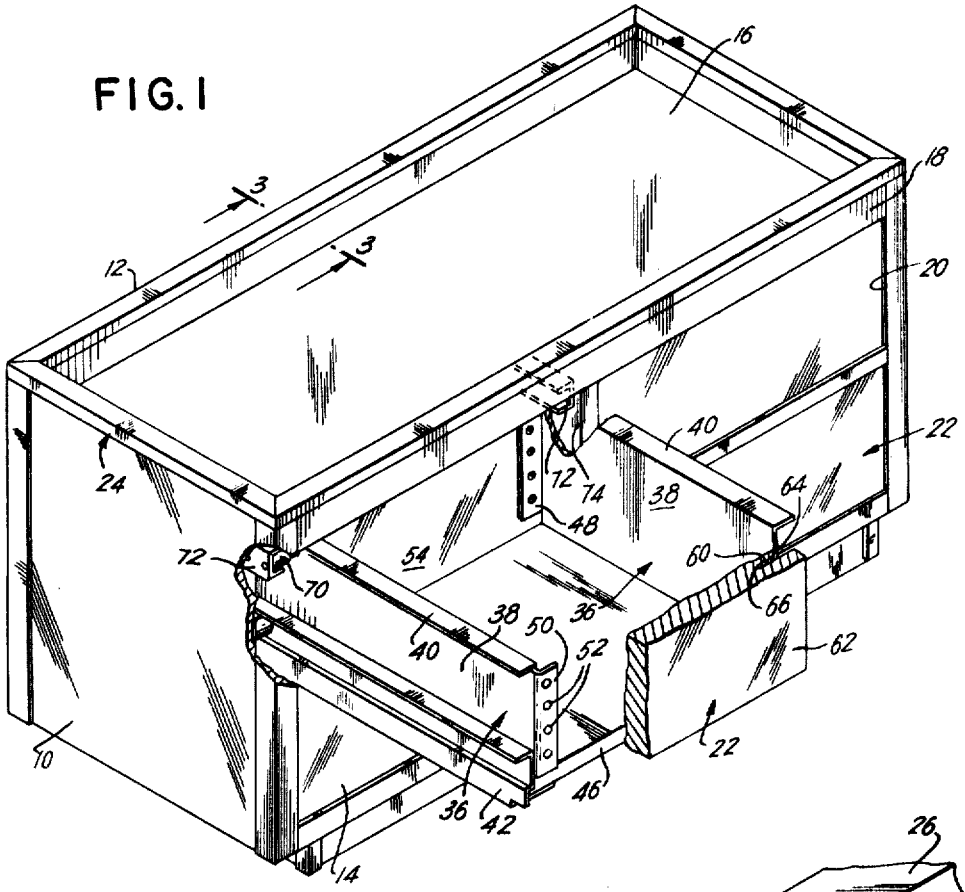
FIG. 1 is an isometric view of a structure of the present invention in the form of a store counter having drawers, in assembled state with one drawer partly withdrawn; partly broken away, to show structural details.
Figure 2:
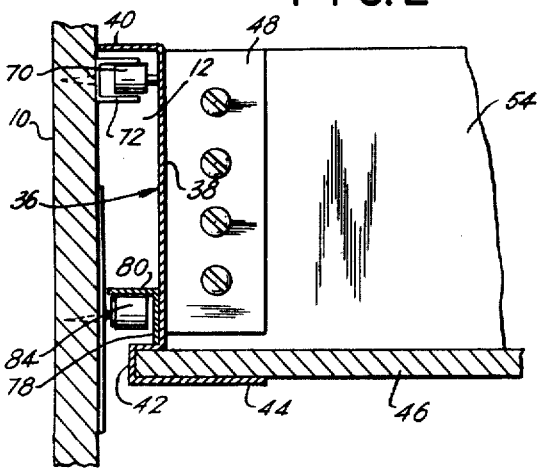
FIG. 2 is a section taken on line 2—2 of FIG. 1.
Figure 3:
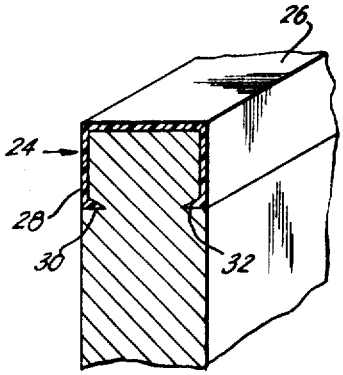
FIG. 3 is a fragmentary section taken on line 3—3 of FIG. 1.

Referring now in greater detail to the embodiment of the invention illustrated in the drawings, the fixture or counter therein shown comprises an outer structure comprising side walls, 10, a rear wall 12, a bottom wall, 14, and a top wall, 16. The counter also comprises a front wall or frame, 18, having openings, 20, for receiving a plurality of drawers, each generally designated as 22.

The panels forming the several walls of the structure of the present invention may be precut at the factory and shipped and stored, to be assembled at the point of use by either of the means described and claimed in my co-pending applications, Serial No. 415,080, filed Dec. 1, 1964, and Serial No. 415,081 filed Dec. 1, 1964. In the embodiment illustrated in the drawings, such means of assembly is indicated as being of that described in my co-pending application, Serial No. 415,081.

In the embodiment of the invention illustrated in the drawings, the side rear and front walls of the counter are shown to be elevated above the top wall to provide a tray formation at the top of the counter and the top edges of the sides and rear walls and the front frame 10, 12, and 18 are protected against damage by means of a channel-shaped shield, generally designated as 24, as of plastic or metal preferably formed by extrusion, consisting of top wall 26, and side walls 28, each formed with an inwardly extending preferably tapering narrow flange, 30, along its longitudinal edge. To receive and hold the channel-shaped shield 24 the sides of the upper end portions of the walls 10 and 12 and the depth of the front frame 20 may be reduced in thickness, one each side along their entire length to a depth equal to the height of the walls 26 and 28 of the channel member 24 and to a height equal to the height of side walls, and may be provided at the bases of the reduced portions with grooves 32, each adapted to receive one of the flanges 30 to hold the shield in place. Precut sections of the channel-shaped shield 24 of an appropriate length for the side walls, the rear wall and front frame, and appropriately mitered, may be provided in the shipping kit of the counter of the invention and these shield sections may be slid on their respective wall portions before these walls are assembled with one another.

Each drawer 22 comprises a pair of side walls, each generally designated as 36, formed, preferably, of a material that may be stamped, molded or cast, such as metal. Each side wall 36 includes a flat, upright wall section, 38, extending substantially the length of the drawer, provided with an outwardly-offset flange, 40, at its upper end and an inwardly-facing channel section, 42, at its lower edge, likewise extending substantially the length thereof. Such channel section 42 may preferably project outwardly from the upright wall portion 38 and its bottom side, 44, may preferably project inwardly past the upright wall section 38. The two channel sections 42 of the two side walls 38 of each drawer serve to engage and support opposed side edges of a drawer bottom, 46.

Each of the side walls 38 of the drawer is also formed with inwardly-offset portions or flanges, 48 and 50, respectively, extending substantially the height thereof, at its inner and outer edges, respectively; each provided with a plurality of vertically-spaced screw-receiving openings, 52. The rear wall, 54, of the drawer may be secured against either the inner or the outer faces of the inner flanges 48, as by screws, 56, and the front wall of the drawer may be secured to the outer flanges 50 of the drawer wall sections 38. In order not to detract from the appearance of the front of the drawer, the front wall may be secured thereto in a manner to cover the entire drawer opening 20 and, if desired, to overlie the marginal edge portion of the frame 18, surrounding the drawer opening 20. To that end, the vertical edges of the front wall may have their inner corners cut away to define an inner wall section, 60, equal to the inner width of the drawer, and an outer wall section, 62, of a length and width equal, at least, to the length and width of the drawer opening 20; the two sections being defined by a shoulder, 64. To secure the front wall of the drawer on the outer flanges 50, vertical slots, 66, are formed in the front wall, at each end thereof, at the inner end of the shoulders 64. The slots 66 open into the bottom edge of the front wall so that the latter may be slid over the flanges 50. The front wall may then be secured in place on the flanges 50, as by self-threading screws which may be set into the preformed openings in the inner wall portion 60 that engage in the openings 52 of the flanges 50. For neater appearance, the slots 66 may terminate short of the top edge of the front wall.

Roller means may be provided for the sliding suspension of the drawer within the counter. Such suspension means may comprise a roller, 70, mounted on upright section 38 of each side wall 36, at its rear upper corner, below flange 40, and a horizontally-disposed channel member, 72, secured against the adjacent side wall 10, and, where more than one drawer is provided laterally within a counter, also against the adjacent partition, 74, which serves as a second side wall for the adjacent drawer receiving recesses in the counter.

An angle bar extending substantially the length of the side wall section 38 is secured to each side wall, on its exterior, in an arrangement wherein free edge of one leg, 78, will abut the top of the channel section 42, with the other leg, 80, spaced from and disposed above said channel section, and a roller, 84, is secured against the adjacent side wall 10 or partition 74 at its lower front corner, adjacent the front edges, in position to underlie and substantially abut the underside of the angle bar leg 80 when the roller 72 is disposed within the channel member 72. Where a plurality of vertically-arranged drawers are provided in the counter, the rollers 84 for each of the drawers in a vertical row may be secured and mounted on a metal plate, 86, in appropriately spaced relation for engaging the angle bar legs 80 of the several drawers 22.

This completes the description of the structure of the present invention. It will be readily apparent that the several parts forming the outer part of the structure, as well as the drawers thereof, may be readily pre-formed at a factory in appropriate matching sizes and shapes and shipped in knockdown state to a point of use. It will also be readily apparent that when desired to set up, the shield sections 24 may be slipped over the projecting top edges with the side and rear walls and the front frame and the side and rear walls and frame may be readily assembled with one another and with the top and bottom walls in the manner described in either of my aforesaid co-pending applications. It will be understood that the rollers 70 and the angle bars 78–80 will be secured in appropriate position on the drawer sides at the point of manufacture. The channels 72 and the rollers 84 may be secured to side walls 10 and partitions 74, either at point of manufacture or at point of assembly; suitable guide marks being provided on the walls and partitions, in the latter instance. The rollers 84 may be secured directly to the walls 10 and partitions 74 or to the bar 86.

It will be readily apparent that the accurate assembly of the structure of the present invention may be readily effected at the point of use by anyone having a minimum of skill in the use of simple tools. It will also be apparent that the assembled structure will be strong and sturdy and its drawers will operate easily and smoothly; the vertical spacing of the rollers 70 and 84 assuring the steadiness of the drawers during their sliding movement and their adequate support even when in withdrawn position. It will be likewise apparent that the structure of the present invention will have maximum protection against being marred or damaged and that any damaged part thereof may be easily, quickly, and economically replaced without the need for replacing the entire structure.

It will be further apparent that numerous modifications and variations may be made in the structures of the present invention by anyone skilled in the art, in accordance with the principles of the invention hereinabove set forth, without the exercise of any inventive ingenuity. I desire, therefore, to be protected for any and all such variations and modifications that may be made within the spirit of the invention and scope of the claims hereto appended.

What we claim is:

1. In combination, a cabinet, including spaced upright walls defining a drawer compartment and a drawer for said cabinet slidably supported between said upright walls in said compartment, said drawer including spaced side walls each having means at its front and rear ends for securing front and rear drawer walls thereto, each said side wall having a longitudinally-extending channel at its bottom facing the channel of the other of said side walls, said channels adapted to receive a bottom wall of said drawer, said bottom wall supported by its marginal edge portions within said channels, and means slidably supporting said drawer in said cabinet, said means including a roller mounted on the outer face of each of said drawer side walls at its upper rear corner for rotation on an axis normal to said face, a horizontally-extending outwardly-projecting bar secured to the outer face of each of said drawer side walls in normal relation to said face, in vertically spaced relation to said roller, a horizontally-extending, inwardly-facing channel provided on each of said upright walls at the top end of said drawer compartment in position to receive the adjacent of said drawer-supported rollers thereon, and a roller rotatably mounted on the inner face of each of said upright walls at its lower front corner, in position to support the adjacent of said bars when said drawer-supported rollers are disposed within said upright wall-supported channels.

2. The cabinet of claim 1, wherein said channels project outwardly from said side wall and the bottom side of each said channel projects inwardly past said side wall.

3. The cabinet of claim 2, wherein said bar comprises a leg of an angle bar, said angle bar secured to said drawer side walls by the other leg thereof with its free edge disposed against the top side of said channel.

4. The cabinet of claim 1, wherein said means for securing said front and rear walls of said drawer comprise an inwardly-offset flange at each end of each of said drawer side walls, each said flange having screw-receiving openings formed therethrough.

5. The cabinet of claim 1, wherein said front wall comprises an inner section of a length to fit between said drawer side walls and an outer section of greater length, and wherein a vertically-disposed, inwardly-extending groove is formed in said front wall at each junction of said two wall sections, each said groove adapted to receive therewithin the inwardly-offset front flange of a drawer side wall.

6. The cabinet of claim 5, wherein said front wall is of a height greater than the height of said flanges and said grooves terminate short of the top edge of said front wall.

7. The cabinet of claim 1, wherein said cabinet is formed with a pair of vertically-spaced drawer compartments and wherein said roller for the lower front corner of each said cabinet side walls of each said compartment, is mounted on a bar in common with the others, said bar secured in upright arrangement adjacent a forward edge of each said cabinet side wall.

8. The cabinet of claim 1, wherein a rear and top wall are provided on said cabinet and wherein said walls project above said top wall and wherein a shield is provided for the edges of said projecting portions, said shield comprising a channel member, including top and side walls, said shield having inwardly-offset projections at the edge of each of its side walls, said projecting edge portions of each said walls having grooves formed in its side faces adapted to slidably receive the projecting portions of said channel side walls.

9. The cabinet of claim 8, wherein said channel members have an outer thickness equal to the thickness of a projecting portion of the wall on which it is mounted and the marginal edge portions of said walls above said grooves have their side faces inwardly offset to an extent equal to the thickness of a side wall of said channel member.

10. A sliding drawer for a cabinet comprising spaced side walls each having means at its front and rear ends for securing front and rear drawer walls thereto, each said side walls having a longitudinally-extending channel at its bottom facing the channel of the other of said side walls, each said channel projecting outwardly of its side wall and having its bottom wall extending inwardly past its side wall, a bottom wall supported by its marginal side edge portions within said channels, and means on the outer face of each of said side walls for slidably supporting the same, said means including a roller supported at one rear corner thereof and a longitudinally-disposed runner bar secured to said side wall in vertically-spaced relation to said roller.

11. The drawer of claim 10, wherein said means on said drawer side walls for securing front and rear walls thereto comprise integrally-formed inwardly-offset flanges at the front and rear end of each of said side walls, said flanges each having screw-receiving openings formed therethrough.

12. The drawer of claim 11, including a front wall, said front wall having an inner section along its length adapted to fit closely between the inner face of said side wall and an outer section of greater length than said inner section and projecting past said inner section at each end thereof, and a vertically-disposed, inwardly-extending groove formed at each end of said front wall at the junction of said inner section and outer section thereof, each said groove adapted to slidably receive therein the front end flange of a drawer side wall.

13. The drawer of claim 12, wherein said grooves terminate short of the top edge of said front wall.

*14. The cabinet of claim 1 wherein a wall thereof is arranged to have the marginal portion of an edge thereof free and unconnected to any other wall of said cabinet along at least a portion of its length, and wherein a shield is provided for said marginal portion of said wall, said shield comprising a channel member including side walls and a connecting wall, said shield having outwardly offset projections at the edge of each of its side walls, said marginal edge portion of said walls having grooves formed in its side faces adapted to slidably receive the said inwardly projecting portions of said channel side walls.*

*15. The cabinet of claim 14, wherein said channel member has an outer thickness equal to the normal thickness of said free marginal edge portion of said wall, and said marginal edge portion of said wall, outwardly of said grooves, has its side faces inwardly offset to an extent equal to the thickness of a side wall of said channel member.*

References Cited

The following references, cited by the Examiner, are of record in the patented file of this patent or the original patent.

UNITED STATES PATENTS

| | | | |
|---|---|---|---|
| 2,212,191 | 8/1940 | Dietz | 312—343 |
| 2,418,244 | 4/1947 | Baird | 312—343 |
| 2,678,866 | 5/1954 | Merrett | 312—349 |
| 2,376,570 | 5/1945 | Berger | 312—349 |
| 3,284,152 | 11/1966 | Schörghuber | 312—257 |

JAMES T. McCALL, Primary Examiner